United States Patent
Yu et al.

(10) Patent No.: US 12,074,729 B2
(45) Date of Patent: Aug. 27, 2024

(54) MESSAGE ENCAPSULATION METHOD AND APPARATUS, AND MESSAGE DECAPSULATION METHOD AND APPARATUS

(71) Applicant: ZTE Corporation, Shenzhen (CN)

(72) Inventors: Jinghai Yu, Shenzhen (CN); Quan Xiong, Shenzhen (CN); Xingquan Liu, Shenzhen (CN); Ruibo Han, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 4 days.

(21) Appl. No.: 17/773,860

(22) PCT Filed: Nov. 3, 2020

(86) PCT No.: PCT/CN2020/126209
§ 371 (c)(1),
(2) Date: May 3, 2022

(87) PCT Pub. No.: WO2021/088813
PCT Pub. Date: May 14, 2021

(65) Prior Publication Data
US 2022/0393908 A1    Dec. 8, 2022

(30) Foreign Application Priority Data
Nov. 8, 2019    (CN) .......................... 201911089691.6

(51) Int. Cl.
*H04L 12/46* (2006.01)
*H04L 61/2592* (2022.01)
*H04L 69/22* (2022.01)

(52) U.S. Cl.
CPC ...... *H04L 12/4633* (2013.01); *H04L 61/2592* (2013.01); *H04L 69/22* (2013.01); *H04L 2212/00* (2013.01)

(58) Field of Classification Search
CPC ............. H04L 12/4633; H04L 2212/00; H04L 61/256; H04L 61/2592; H04L 69/22; H04L 61/2514; H04L 61/2517
See application file for complete search history.

(56) References Cited

U.S. PATENT DOCUMENTS

| | | | |
|---|---|---|---|
| 6,519,254 B1 | 2/2003 | Chuah | |
| 2015/0188818 A1* | 7/2015 | Alkhatib | ............... H04L 45/745 370/392 |

(Continued)

FOREIGN PATENT DOCUMENTS

| | | |
|---|---|---|
| CN | 110167068 A | 8/2019 |
| CN | 110417707 A | 11/2019 |

OTHER PUBLICATIONS

European Search Report for corresponding application EP20884959; Report dated Nov. 28, 2022.

(Continued)

*Primary Examiner* — Zhensheng Zhang
(74) *Attorney, Agent, or Firm* — CANTOR COLBURN LLP

(57) ABSTRACT

A message encapsulation method and apparatus, and a message decapsulation method and apparatus are provided. The message encapsulation method includes encapsulating a first message according to a preset encapsulation format to obtain a second message, where the first message is obtained by encapsulating a traffic stream, the second message carries stream attribute information, and the stream attribute information is used for indicating a feature attribute of the traffic stream.

15 Claims, 5 Drawing Sheets

1002

Reception module

(56) References Cited

U.S. PATENT DOCUMENTS

| | | |
|---|---|---|
| 2017/0208032 A1 | 7/2017 | Cox |
| 2018/0191471 A1* | 7/2018 | Elhaddad .................. H04L 1/24 |
| 2019/0116485 A1 | 4/2019 | Vasseur |
| 2019/0132150 A1* | 5/2019 | Ramachandran ... H04L 12/4633 |

OTHER PUBLICATIONS

Finn Huawei P Thubert Cisco B Varga, "Deterministic Networking Architecture; rfc8655.txt", Oct. 24, 2019, pp. 1-24, XP015135163.
International Search Report for corresponding application PCT/CN2020/126209 filed Nov. 3, 2020; Mail date Jan. 19, 2021.

* cited by examiner

Fig. 1
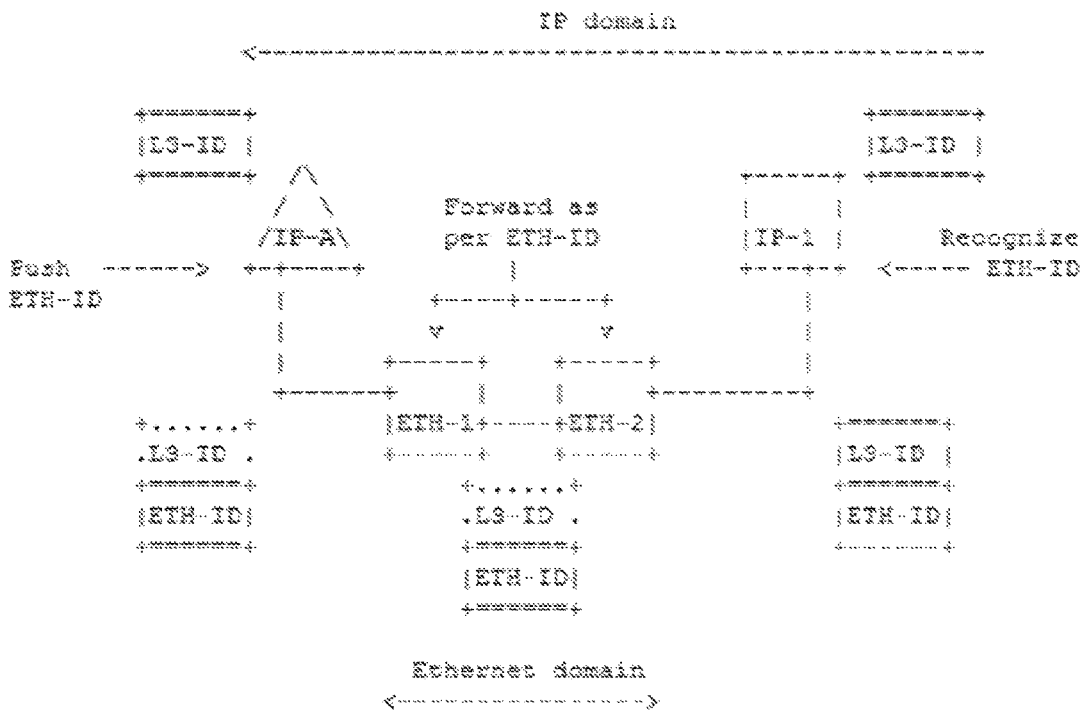
Fig. 2
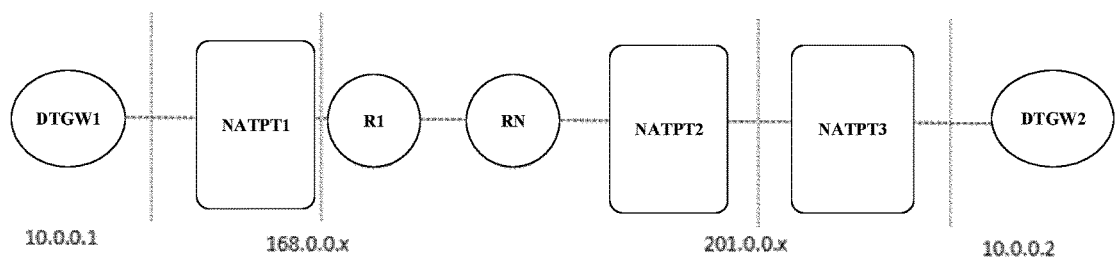
Fig. 3
| Encapsulate a first message according to a preset encapsulation format to obtain a second message, where the first message is obtained by encapsulating a traffic stream, the second message carries stream attribute information, and the stream attribute information is used for indicating a feature attribute of the traffic stream | S102 |

Fig. 8

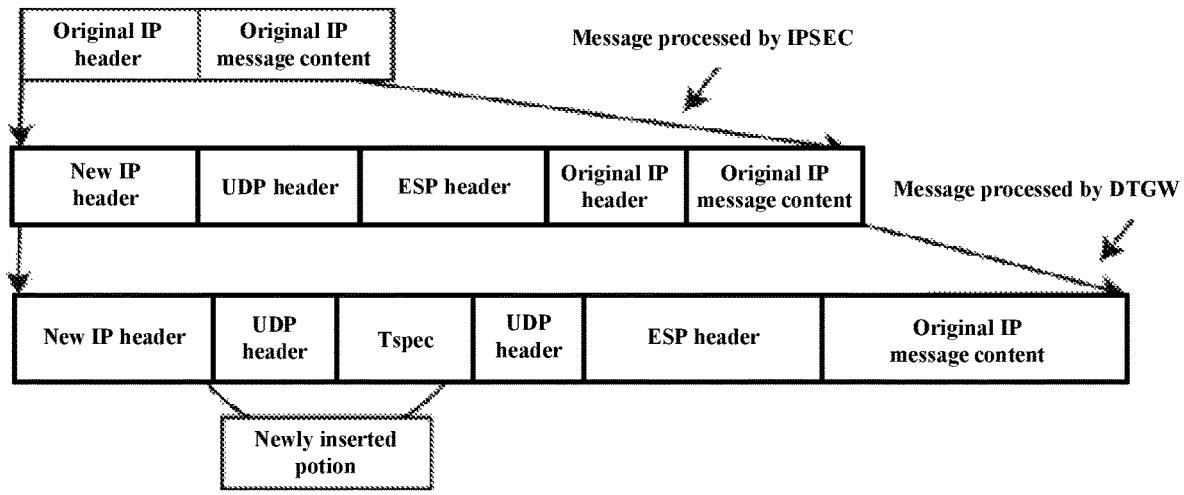

Fig. 9

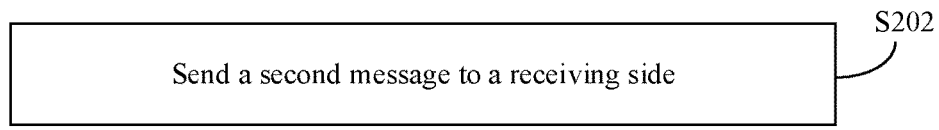

Send a second message to a receiving side — S202

Fig. 10

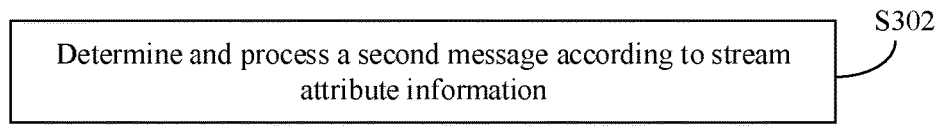

Determine and process a second message according to stream attribute information — S302

Fig. 11

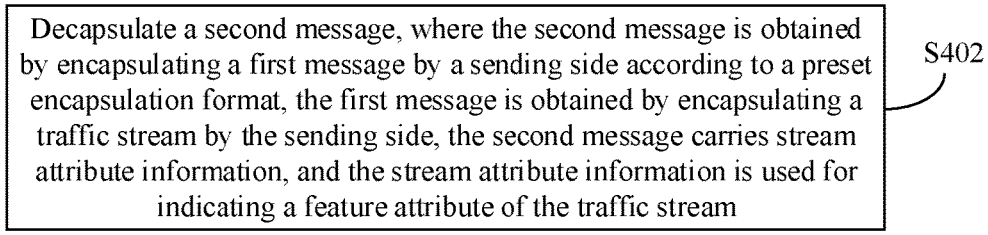

Decapsulate a second message, where the second message is obtained by encapsulating a first message by a sending side according to a preset encapsulation format, the first message is obtained by encapsulating a traffic stream by the sending side, the second message carries stream attribute information, and the stream attribute information is used for indicating a feature attribute of the traffic stream — S402

Fig. 12

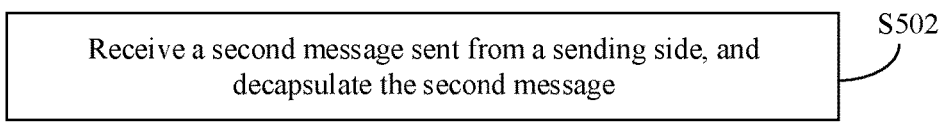

Receive a second message sent from a sending side, and decapsulate the second message — S502

MESSAGE ENCAPSULATION METHOD AND APPARATUS, AND MESSAGE DECAPSULATION METHOD AND APPARATUS

CROSS REFERENCE

This application is a National Stage Filing of the PCT International Application No. PCT/CN2020/126209 filed on Nov. 3, 2020, which claims priority to Chinese Application No. 201911089691.6 filed on Nov. 8, 2019, the entirety of which is herein incorporated by reference.

TECHNICAL FIELD

The present disclosure relates to the field of communication, in particular to a message encapsulation method and apparatus, and a message decapsulation method and apparatus.

BACKGROUND

In a draft of a standard Detnet working group of an Internet engineering task force (IETF), an IP-based stream identity mapping problem is raised for processing of a deterministic traffic stream, and a processing solution to stream identity mapping in different Detnet encapsulation is specifically proposed. FIG. 1 is a schematic diagram of stream identity mapping in the related art. As shown in FIG. 1, the mapping relation in the related art is generally fixed, in other words, the mapping relation in the related art does not change dynamically.

In most cases, the processing method described above is valid, but it does not work under the condition of processing by means of a network address translator (NAT) or a network address translator protocol translator (NATPT) with a protocol translator. FIG. 2 is a schematic diagram of a transmission process traversing a NATPT in the related art. As shown in FIG. 2, the traffic stream to be transmitted needs to traverse a plurality of NATPTs to reach the destination. In the transmission process of the traffic stream, each time the traffic stream traverses the NATPT, the external IP address and the port number may change, and the change caused each time the traffic stream traverses the NATPT does not follow a fixed mapping contrast relation. Therefore, a method based on a fixed mapping relation for tracking a deterministic traffic stream in the related art is invalid in the above case.

For the above problem that the processing for the deterministic traffic stream in the related art is not applicable, no effective solution is provided in the related art.

SUMMARY

Embodiments of the present disclosure provide a message encapsulation method and apparatus, and a message decapsulation method and apparatus, which can at least solve the problem that the processing for the deterministic traffic stream in the related art is not applicable.

According to an embodiment of the present disclosure, provided is a message encapsulation method. The message encapsulation method is applied at a sending side and includes encapsulating a first message according to a preset encapsulation format to obtain a second message, where the first message is obtained by encapsulating a traffic stream, the second message carries stream attribute information, and the stream attribute information is used for indicating a feature attribute of the traffic stream.

According to another embodiment of the present disclosure, further provided is a message sending method. The method is applied at a sending side and includes sending a second message to a receiving side, where the second message is obtained according to the message encapsulation method of the above embodiment.

According to another embodiment of the present disclosure, further provided is a message processing method. The method is applied at an intermediate node and includes determining and processing a second message according to stream attribute information, where the second message is obtained according to the message encapsulation method of the above embodiment.

According to another embodiment of the present disclosure, further provided is a message decapsulation method. The method is applied at a receiving side and includes decapsulating a second message, where the second message is obtained by encapsulating a first message by a sending side according to a preset encapsulation format, the first message is obtained by encapsulating a traffic stream by the sending side, the second message carries stream attribute information, and the stream attribute information is used for indicating a feature attribute of the traffic stream.

According to another embodiment of the present disclosure, further provided is a message decapsulation method. The method is applied at a receiving side and includes receiving a second message sent from a sending side, and decapsulating the second message according to the message decapsulation method of the above embodiment.

According to another embodiment of the present disclosure, further provided is a message encapsulation apparatus. The apparatus is applied at a sending side and includes an encapsulation module configured to encapsulating a first message according to a preset encapsulation format to obtain a second message, where the first message is obtained by encapsulating a traffic stream, the second message carries stream attribute information, and the stream attribute information is used for indicating a feature attribute of the traffic stream.

According to another embodiment of the present disclosure, further provided is a message encapsulation apparatus. The apparatus is applied at a sending side and includes a sending module configured to send a second message to a receiving side, where the second message is obtained by means of the message encapsulation apparatus of the above embodiment.

According to another embodiment of the present disclosure, further provided is a message processing apparatus. The apparatus is applied at an intermediate node and includes a processing module configured to determine and process a second message according to stream attribute information, where the second message is obtained according to the message encapsulation apparatus of the above embodiment.

According to another embodiment of the present disclosure, further provided is a message decapsulation apparatus. The apparatus is applied at a receiving side and includes a decapsulation module configured to decapsulate a second message, where the second message is obtained by encapsulating a first message by a sending side according to a preset encapsulation format, the first message is obtained by encapsulating a traffic stream by the sending side, the second message carries stream attribute information, and the stream attribute information is used for indicating a feature attribute of the traffic stream.

According to another embodiment of the present disclosure, further provided is a message reception apparatus. The apparatus is applied at a receiving side and includes a reception module configured to receive a second message sent from a sending side, and to decapsulate the second message according to the message decapsulation method of the above embodiment.

According to another embodiment of the present disclosure, further provided is a computer-readable storage medium. The computer-readable storage medium stores a computer program, where the computer program is configured to execute the operations of any one of the above mentioned method embodiments at runtime.

According to another embodiment of the present disclosure, further provided is an electronic apparatus. The electronic apparatus includes a memory and a processor, where the memory stores a computer program, and the processor is configured to run the computer program to execute the operation of any one of the method embodiments described above.

By means of the embodiments of the present disclosure, a first message may be encapsulated according to a preset encapsulation format to obtain a second message, where the first message is obtained by encapsulating a traffic stream, the second message carries stream attribute information, and the stream attribute information is used for indicating a feature attribute of the traffic stream. Therefore, the problem that the processing for the deterministic traffic stream in the related art may not be applicable can be solved, so as to achieve an effect that the processing for the deterministic traffic stream can be applicable in different transmission processes.

BRIEF DESCRIPTION OF THE DRAWINGS

The accompanying drawings described herein serve to provide a further understanding of the present disclosure and form a part hereof, and the illustrative embodiments of the present disclosure and the description of the illustrative embodiments serve to explain the present disclosure and are not to be construed as unduly limiting the present disclosure. In the drawings:

FIG. 1 is a schematic diagram of stream identity mapping in the related art;

FIG. 2 is a schematic diagram of a transmission process traversing a NATPT in the related art;

FIG. 3 is a flowchart of a message encapsulation method provided in an embodiment of the present disclosure;

FIG. 8 is a schematic diagram of a fourth encapsulation format provided in an embodiment of the present disclosure;

FIG. 9 is a flowchart of a message sending method provided in an embodiment of the present disclosure;

FIG. 10 is a flowchart of a message processing method provided in an embodiment of the present disclosure;

FIG. 11 is a flowchart of a message decapsulation method provided in an embodiment of the present disclosure;

FIG. 12 is a flowchart of a message reception method provided in an embodiment of the present disclosure;

DETAILED DESCRIPTION

Figure 4:
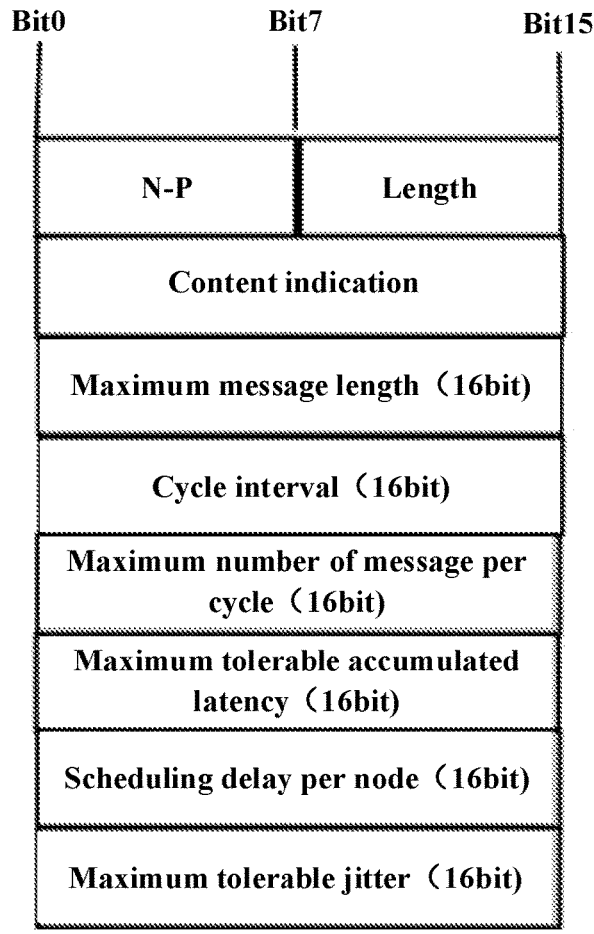
FIG. 4 is a schematic diagram of a Tspec field provided in an embodiment of the present disclosure.

The present disclosure will be described in detail below with reference to the accompanying drawings in conjunction with embodiments. It should be noted that the embodiments in the present disclosure and features in the embodiments can be combined without conflicts.

It should be noted that the terms "first", "second" and so forth, in the description and claims of the present disclosure and in the above-mentioned drawings, are used to distinguish between similar objects and not necessarily to describe a particular order or sequential order.

Embodiment 1

The embodiment provides a message encapsulation method applied at a sending side. FIG. 3 is a flowchart of a message encapsulation method provided in an embodiment of the present disclosure. As shown in FIG. 3, the method in the embodiment includes the following operation.

At S102, a first message is encapsulated according to a preset encapsulation format to obtain a second message, where the first message is obtained by encapsulating a traffic stream, the second message carries stream attribute information, and the stream attribute information is used for indicating a feature attribute of the traffic stream.

It needs to be further noted that the first message refers to a message obtained by encapsulating a traffic stream to be sent according to a conventional message format in the related art. Generally, the first message includes an Internet protocol (IP) header field and an IP content field, and this IP header field and this IP content field are respectively referred to as an original IP header field and an original IP content field in this embodiment. Specific components of the original IP header field and the original IP content field can be known by those having ordinary skill in the art according to common general knowledge in the art and are not repeated here.

According to the embodiment, when encapsulating the first message according to the preset encapsulation format to obtain the second message, the encapsulation may be carried out according to the preset encapsulation format on the basis of the first message, or the encapsulation may be carried out according to a combination of the encapsulation formats corresponding to the first message and the second message directly on the basis of the traffic stream to be sent, which is not limited herein.

It should be further noted that the S102 is performed by the sending side, e.g., a deterministic traffic gateway (DTGW) of the sending side.

Through the message encapsulation method in the embodiment, a first message may be encapsulated according to a preset encapsulation format to obtain a second message, where the first message is obtained by encapsulating a traffic stream, the second message carries stream attribute information, and the stream attribute information is used for indicating a feature attribute of the traffic stream. Therefore, the message encapsulation method in the embodiment can solve the problem that the processing for the deterministic traffic stream in the related art may not be applicable, so as to achieve an effect that the processing for the deterministic traffic stream can be applicable in different transmission processes.

Specifically, since the second message in the embodiment carries the stream attribute information, even if the second message is required to traverse a network address translator (NAT) or a network address translator protocol translator (NATPT) during transmission of the second message and accordingly an external IP address and a port number are made to be changed, a determined mapping relation with the corresponding traffic stream can still be established for the second message according to the stream attribute information, so that tracking processing between the sending side and the receiving side for the traffic stream may still be implemented.

In an exemplary embodiment, the operation of encapsulating the first message according to the preset encapsulation format to obtain the second message includes the following operation.

At least a traffic specification (Tspec) field is inserted at a preset position of the first message according to the preset encapsulation format to obtain the second message, where the Tspec field includes the stream attribute information.

It is to be further noted that since the Tspec field inserted in the first message includes the stream attribute information, the first message after the Tspec field is inserted, that is, the second message, carries the stream attribute information.

In an exemplary embodiment, the stream attribute information includes at least one of:

a maximum frame length, a cycle interval, a maximum number of message per cycle, a maximum tolerable accumulated latency, a scheduling delay per node, and a maximum tolerable accumulated jitter.

In an exemplary embodiment, the Tspec field includes a next protocol (N-P) field, a length field, a content indication field, and an information field.

The content indication field is used for indicating, according to a preset bit definition, a type of the stream attribute information and whether the stream attribute information of the corresponding type appears in the information field. The information field is used for indicating content of the stream attribute information.

It is to be further noted that the N-P field is used for indicating a subsequent protocol type of the N-P field; the length field is used for indicating a total length of the Tspec field; and the content indication field is used for indicating that one or more pieces of stream attribute information in a subsequent information field of the content indication field appear in a preset sequence. Specifically, the content indication field includes a plurality of bits arranged in the preset sequence so as to correspondingly indicate whether to use the stream attribute information in the subsequent information field, for example, "1" may indicate that the corresponding stream attribute information will appear in the subsequent information field, and "0" may indicate that no corresponding stream attribute information will appear in the subsequent information field. In the present embodiment, only bits 0-5 in the content indication field are used, and the remaining bits are temporarily reserved.

In the above information field, the above stream attribute information includes: a maximum frame length, a cycle interval, a maximum number of message per cycle, a maximum tolerable accumulated latency, a scheduling delay per node, and a maximum tolerable accumulated jitter. The specific meaning of the above stream attribute information is described as follows.

The maximum frame length is used for indicating a maximum message length of the second message after the traffic stream is encapsulated, and is recorded as maxFrameSize. The maximum frame length is indicated by bit 0 in the content indication field, where the condition that a value of the bit is 0 indicates that there is no such information encoded, and the condition that the value of the bit is 1 indicates that there is such information.

The cycle interval is used for indicating an expected scheduling interval, may also indicate a cycle interval of the second message, has a unit of nanosecond (ns), and is recorded as cycleTime. The cyclic interval is indicated by bit 1 in the content indication field, where the condition that a value of the bit is 0 indicates that there is no such information encoded, and the condition that the value of the bit is 1 indicates that there is such information.

The maximum number of message per cycle is used for indicating a maximum possible number of message in a time length indicated by the cycle interval and is recorded as MaxIntervalFrames. The maximum number of message per cycle is indicated by bit 2 in the content indication field, where the condition that a value of the bit is 0 indicates that there is no such information encoded, and the condition that the value of the bit is 1 indicates that there is such information.

The maximum tolerable accumulated latency is used for indicating a maximum accumulated latency on a second message forwarding path, may be used for path computation, has a unit of nanosecond (ns), and is recorded as maxAccumatedLatency. The maximum tolerable accumulated latency is indicated by bit 3 in the content indication field, where the condition that a value of the bit is 0 indicates that there is no such information encoded, and the condition that the value of the bit is 1 indicates that there is such information.

The scheduling delay per node is used for asynchronous scheduling, and in a case where a value corresponding to the scheduling delay per node is smaller than or equal to 7, the scheduling delay per node is used for indicating that scheduling is expected to be performed in which scheduling period after a period of the message is received. The scheduling period depends on a time scheduling period in the device and a queue scheduling time slice, for example, a TimeInterval of 802.1 Qbv.

In a case where the value corresponding to the scheduling delay per node is larger than 7, the scheduling delay per node is used for indicating how long the scheduling is expected, has a unit of nanosecond (ns), and is recorded as perNodeSchDelay. The scheduling delay per node is indicated by bit 4 in the content indication field, where the condition that a value of the bit is 0 indicates that there is no such information encoded, and the condition that the value of the bit is 1 indicates that there is such information.

The maximum tolerable accumulated jitter is used for indicating a maximum accumulated jitter on the message forwarding path. The maximum tolerable accumulated jitter may be used for time slot scheduling and path computation.

In a case where a value corresponding to the maximum tolerable accumulated jitter is smaller than or equal to 7, the maximum tolerable accumulated jitter is used for indicating a jitter range=cycleTime/(MaxIntervalFrames* maxAccumatedJitter).

In a case where the value corresponding to the maximum tolerable accumulated jitter is larger than 7, the maximum tolerable accumulated jitter indicates a tolerable accumulated jitter time, has a unit of nanosecond (ns), and is recorded as maxAccumatedJitter. The maximum tolerable accumulated jitter is indicated by bit 5 in the content indication field, where the condition that a value of the bit is 0 indicates that there is no such information encoded, and the condition that the value of the bit is 1 indicates that there is such information.

It is to be further noted that the above stream attribute information is merely partially information that can characterize the feature attribute of the traffic stream, and the Tspec field in this embodiment may also redefine new stream attribute information on the basis of the above information field, which is not limited herein. FIG. 4 is a schematic diagram of a Tspec field provided in an embodiment of the present disclosure, and a structure of the Tspec field is shown in FIG. 4.

In an exemplary embodiment, the operation of encapsulating the first message according to the preset encapsulation format to obtain the second message further includes the following operation.

The Tspec field and a user datagram protocol (UDP) header field are inserted at the preset position of the first message according to the preset encapsulation format to obtain the second message, where the UDP header field is inserted in front of the Tspec field.

It is to be further noted that the UDP header field is used for indicating that the Tspec field appears after the UDP header field in the second message; and specifically, the UDP header field may perform indication by means of a destination port number, for example, a 4600 port.

In an exemplary embodiment, the operation of encapsulating the first message according to the preset encapsulation format to obtain the second message includes the following operations.

An encapsulation rule is configured, and the first message is encapsulated according to the encapsulation rule to obtain the second message, where the operation of configuring an encapsulation rule includes: the encapsulation format is configured and a deterministic traffic stream matching rule is configured.

The deterministic traffic stream matching rule is used for matching the traffic stream with a deterministic traffic stream.

It is to be further noted that the above encapsulation rule is used for configuration of the encapsulation format on the one hand and for configuration of the deterministic traffic stream matching rule on the other hand. The deterministic traffic stream matching rule may specifically match a traffic stream to be sent so as to determine whether the traffic stream needs to be encapsulated according to the message encapsulation method in the embodiment.

In an exemplary embodiment, the encapsulation format includes one of a first encapsulation format, a second encapsulation format, a third encapsulation format, or a fourth encapsulation format.

The first encapsulation format includes an original IP header field, a UDP header field, the Tspec field and an original IP content field.

The second encapsulation format includes a new IP header field, a UDP header field, the Tspec field, an original IP header field and an original IP content field.

The third encapsulation format includes an original IP header field, a new UDP header field, the Tspec field, an original UDP header field, an encoding symbol identifier (ESI) header field and an original IP message content field.

The fourth encapsulation format includes a new IP header field, a new UDP header field, the Tspec field, an original UDP header field, an encapsulating security payload (ESP) header field, an original IP header field and an original IP content field.

It is to be further noted that the first encapsulation format and the second encapsulation format may be correspondingly selected or determined according to the configured encapsulation format, and the third encapsulation format and the fourth encapsulation format may be correspondingly selected or determined according to an encapsulation format used by the first message, specifically, the third encapsulation format and the fourth encapsulation format are encapsulation formats employed in a case where ipsec processing has been performed in the first message.

The first encapsulation format may also be referred to as a transmission mode, the second encapsulation format may also be referred to as a tunnel mode, and the third and fourth encapsulation formats may also be referred to as a fusion mode or a hybrid mode.

In an exemplary embodiment, the operation of encapsulating the first message according to the encapsulation rule to obtain the second message includes one of the following operations.

In a case where the encapsulation format is configured to be the first encapsulation format and no original UDP header field is included in the first message, the UDP header field and the Tspec field are inserted between the original IP header field and the original IP content field of the first message according to the first encapsulation format, and a protocol field in the original IP header field is adjusted to obtain the second message.

Alternatively, in a case where the encapsulation format is configured to be the second encapsulation format and no original UDP header field is included in the first message, the new IP header field, the UDP header field and the Tspec field are inserted in front of the original IP header field of the first message according to the second encapsulation format to obtain the second message.

Alternatively, in a case where the original UDP header field is included in the first message and the original UDP header field is inserted between the original IP header field and the original IP content field of the first message, the new UDP header field and the Tspec field are inserted between the original IP header field and the original UDP header field of the first message according to the third encapsulation format to obtain the second message.

Alternatively, in a case where the original UDP header field is included in the first message and the original UDP header field is inserted in front of the original IP header field of the first message, the new UDP header field and the Tspec field inserting, between the new IP header field and the original UDP header field of the first message according to the fourth encapsulation format to obtain the second message.

Figure 5:
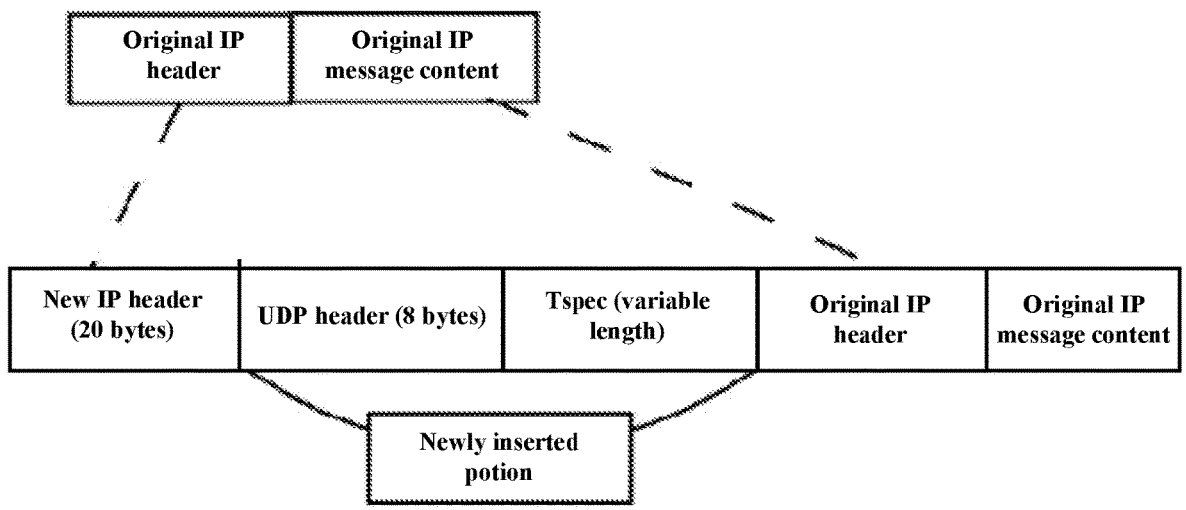
FIG. 5 is a schematic diagram of a first encapsulation format provided in an embodiment of the present disclosure.
Figure 6:
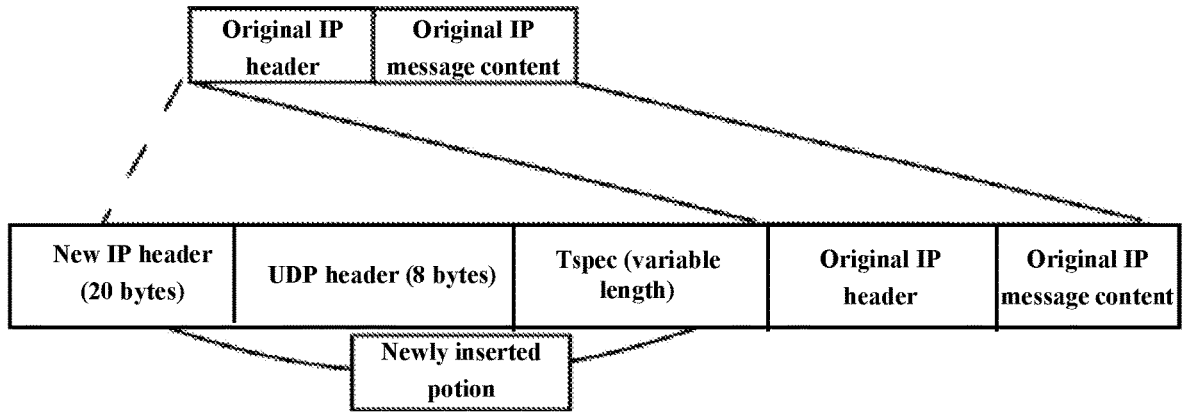
FIG. 6 is a schematic diagram of a second encapsulation format provided in an embodiment of the present disclosure.
Figure 7:
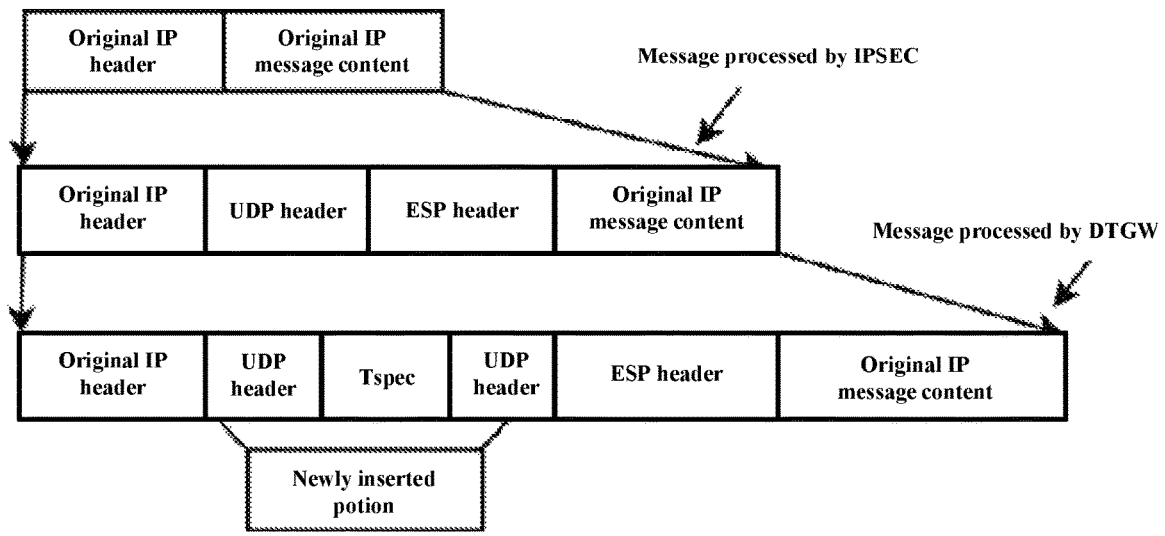
FIG. 7 is a schematic diagram of a third encapsulation format provided in an embodiment of the present disclosure.

FIG. 5 is a schematic diagram of the first encapsulation format provided in the embodiment of the present disclosure, and a structure of the first encapsulation format is shown in FIG. 5. FIG. 6 is a schematic diagram of the second encapsulation format provided in the embodiment of the present disclosure, and a structure of the second encapsulation format is shown in FIG. 6. FIG. 7 is a schematic diagram of the third encapsulation format provided in the embodiment of the present disclosure, and a structure of the third encapsulation format is shown in FIG. 7. FIG. 8 is a schematic diagram of the fourth encapsulation format provided in the embodiment of the present disclosure, and a structure of the fourth encapsulation format is shown in FIG. 8.

It is to be further noted that the first message includes the original UDP header field, which indicates that the first message is a message obtained by ipsec processing on a traffic stream. FIGS. 7 and 8 illustrate two different ipsec processing modes for the traffic stream, that is, an ESP transmission mode and an ESP tunnel mode respectively. The corresponding original UDP header field in the third encapsulation format is inserted between the original IP header field and the original IP content field of the first message, which indicates the ESP transmission mode of ipsec. The corresponding original UDP header field in the fourth encapsulation format is inserted in front of the original IP header field of the first message, which indicates the ESP tunnel mode of ipsec.

In the first encapsulation format, a protocol field in the original IP header field is adjusted, which indicates that the original protocol content indicated in the protocol field in the original IP header field is modified to indicate a UDP protocol, so as to indicate that the original IP header field is followed by the UDP field. The original protocol content indicated in the protocol field is written into the N-P field in the Tspec field so as to indicate the corresponding protocol content after the Tspec field.

In an exemplary embodiment, before the operation of encapsulating the first message according to the preset encapsulation format to obtain the second message, the method further includes the following operation.

Whether a NAT function is configured between the sending side and a receiving side is detected.

It is to be further noted that the NAT function is configured between the sending side and the receiving side, specifically, NAT or NATPT or a related apparatus capable of achieving the network address translation function may be arranged between the sending side and the receiving side. The message encapsulation method in the embodiment needs to be used in a case where it is detected that the NAT function is configured between the sending side and the receiving side, and the message encapsulation method in the embodiment or other encapsulation methods may be used in a case where it is detected that no NAT function is configured between the sending side and the receiving side, which is not limited herein.

The message encapsulation method of the embodiment is further described below by way of exemplary embodiments.

Exemplary Embodiment 1

A DTGW function of a sending side is started, and it is detected that NAT exists in a network between the sending side and a receiving side, that is, the DTGW determines that a message encapsulation method in the above embodiments needs to be used for encapsulating a traffic stream. In view of this, the DTGW configures an encapsulation rule, where the encapsulation rule includes configuring an encapsulation format and configuring a deterministic traffic matching rule.

The sending side needs to transmit a traffic stream with a source address being 10.0.0.3, a destination address being 10.0.0.4, a traffic type being a transmission control protocol (TCP), a source port number of the TCP being 20000, and a destination port number being 5000.

The DTGW firstly matches the traffic stream by means of the deterministic traffic matching rule, and determines that the message encapsulation method in the above embodiments needs to be used for encapsulation. Meanwhile, according to the configuration, the DTGW determines that an encapsulation mode of the traffic stream is a transmission mode, that is, the first encapsulation format in the above embodiments; and in such a case, in a case where the DTGW does not detect that the traffic stream is subjected to ipsec processing, the first encapsulation format may be used for encapsulation.

It is to be further noted that the DTGW may process the traffic stream or a first message obtained by encapsulating the traffic stream in a conventional encapsulation mode. In this embodiment, the scheme in which the DTGW processes the first message is described for illustration, and the following exemplary embodiments 2 to 3 also describes the scheme in which the DTGW processes the first message for illustration, which will not be repeated herein.

It is to be further noted that the DTGW may detect whether a UDP header field, that is, an original UDP header field, exists in the first message or whether a destination port number of the UDP message is a known port number, for example, 4500, used by ipsec, etc. to detect whether the traffic stream is subjected to ipsec processing.

The DTGW detects that the traffic stream is not subjected to ipsec processing.

The DTGW performs insertion operation on the first message according to the first encapsulation format, that is, the UDP header field and a Tspec field are sequentially inserted between an original IP header field and an original IP content field of the first message. According to a stream attribute of the above traffic stream, a maximum frame length=100, a cycle interval=125 ns, and the number of message per interval=16, such that a corresponding Tspec field encoding content is:

an N-P field is 0x06, indicating that a next protocol is tcp; a length field is 10, indicating that a length of the second message is 10; a content indication field is 0x0007, indicating that a maximum frame length, a cycle interval and the number of message per interval exist in the second message; and an information field is 0x0064007D0010, and the content of the stream attribute information is sequentially indicated according to a sequence of the maximum frame length, the cycle interval and the number of message per interval. It is to be further noted that the Tspec fields are each hexadecimal, where the content indication fields are converted to be binary, that is, corresponding to a plurality of bits in the above embodiments, and the information fields are converted to be decimal, corresponding to specific values of the stream attributes.

After encoding of the Tspec field is completed, the first message may be encapsulated. The protocol field of the original IP header field is modified from 0x06 corresponding to the TCP to 0x11 corresponding to the UDP; and then the UDP header field may be inserted between the original IP header field and the original IP content field, and the above Tspec field may be inserted after the UDP header field, where the UDP header field indicates a destination port number of 4600. After the UDP header field and the Tspec field are inserted, the length of the message changes, such that a total length field and a checksum field in the original IP content field need to be modified to increase the length of the message by 18 (where the UDP header field corresponds to 8 bytes, and the Tspec field corresponds to 10 bytes), so as to obtain the second message.

After the DTGW of the sending side obtains the second message, the second message may be sent to a DTGW of the receiving side.

Exemplary Embodiment 2

A DTGW function of a sending side is started, and it is detected that NAT exists in a network between the sending side and a receiving side, that is, the DTGW determines that a message encapsulation method in the above embodiments needs to be used for encapsulating a traffic stream. In view of this, the DTGW configures an encapsulation rule, where the encapsulation rule includes configuring an encapsulation format and configuring a deterministic traffic matching rule.

The sending side needs to transmit a traffic stream with a source address being 10.0.0.5, a destination address being 10.0.0.6, a traffic type being TCP, a source port number of the TCP being 20000, and a destination port number being 5000.

The DTGW firstly matches the traffic stream by means of the deterministic traffic matching rule, and determines that the message encapsulation method in the above embodiments needs to be used for encapsulation. Meanwhile, according to the configuration, the DTGW determines that an encapsulation mode of the traffic stream is a tunnel mode, that is, the second encapsulation format in the above embodiments; and in such a case, in a case where the DTGW does not detect that the traffic stream is subjected to ipsec processing, the second encapsulation format may be used for encapsulation.

The DTGW carries out insertion operation on the first message according to the second encapsulation format, that is, a new IP header field is firstly built, and the new IP header field includes a source address being 10.0.0.5, a destination address being 10.0.0.6 and a protocol type being UDP; and it is further noted that in order to ensure that the set destination address can reach the receiving side, an address in the original IP header field may also be used here. Further, according to a stream attribute of the above traffic stream, a maximum frame length=100, a cycle interval=125 ns, and the number of message per interval=16, such that a corresponding Tspec field encoding content is:

an N-P field is 0x06, indicating that a next protocol is tcp; a length field is 10, indicating that a length of the second message is 10; a content indication field is 0x0007, indicating that a maximum frame length, a cycle interval and the number of message per interval exist in the second message; and an information field is 0x0064007D0010, and the content of the stream attribute information is sequentially indicated according to a sequence of the maximum frame length, the cycle interval and the number of message per interval.

After construction of the new IP header field and encoding of the Tspec field are completed, the first message may be encapsulated, specifically, the new IP header field, the UDP header field, and the Tspec field are sequentially inserted in front of the original IP header field, where the UDP header field indicates a destination port number of 4600. After the UDP header field and the Tspec field are inserted, the length of the message changes, such that a total length field and a checksum field in the original IP content field need to be modified to increase the length of the message by 18 (where the UDP header field corresponds to 8 bytes, and the Tspec field corresponds to 10 bytes), so as to obtain the second message.

After the DTGW of the sending side obtains the second message, the second message may be sent to a DTGW of the receiving side.

Exemplary Embodiment 3

A DTGW function of a sending side is started, and it is detected that NAT exists in a network between the sending side and a receiving side, that is, the DTGW determines that a message encapsulation method in the above embodiments needs to be used for encapsulating a traffic stream. In view of this, the DTGW configures an encapsulation rule, where the encapsulation rule includes configuring an encapsulation format and configuring a deterministic traffic matching rule.

The sending side needs to transmit a traffic stream with a source address being 10.0.0.3, a destination address being 10.0.0.4, a traffic type being TCP, a source port number of the TCP being 20000, and a destination port number being 5000.

The DTGW firstly matches the traffic stream by means of the deterministic traffic matching rule, and determines that the message encapsulation method in the above embodiments needs to be used for encapsulation. Meanwhile, according to the configuration, the DTGW determines that an encapsulation mode of the traffic stream is a transmission mode, that is, the first encapsulation format in the above embodiments; and in such a case, the DTGW detects that the first message corresponding to the traffic stream is subjected to ipsec processing, such that an encapsulation format in the configuration is ignored, and encapsulation is carried out by using a hybrid mode according to the ipsec processing mode, that is, encapsulation is carried out by using a third encapsulation format or a fourth encapsulation format.

According to a stream attribute of the above traffic stream, a maximum frame length=100, a cycle interval=125 ns, and the number of message per interval=16, such that a corresponding Tspec field encoding content is:

an N-P field is 0x06, indicating that a next protocol is tcp; a length field is 10, indicating that a length of the second message is 10; a content indication field is 0x0007, indicating that a maximum frame length, a cycle interval and the number of message per interval exist in the second message; and an information field is 0x0064007D0010, and the content of the stream attribute information is sequentially indicated according to a sequence of the maximum frame length, the cycle interval and the number of message per interval.

After encoding of the Tspec field is completed, the first message may be encapsulated, specifically, the new UDP header field and the Tspec field are sequentially inserted into the first message, an insertion position is selected or determined according to the ipsec processing mode used by the first message. Specifically, in a case where the original UDP header field is located after the original IP header field in the first message, the new UDP header field and the Tspec field are inserted between the original IP header field and the original UDP header field by using the third encapsulation format; in a case where the original UDP header field is located in front of the original IP header field in the first message, the new UDP header field and the Tspec field are inserted between the new IP header field and the original UDP header field by using the fourth encapsulation format, where the new UDP header field indicates the destination port number of 4600. After the new UDP header field and the Tspec field are inserted, the length of the message changes, such that a total length field and a checksum field in the original IP content field need to be modified to increase the length of the message by 18 (where the new UDP header field corresponds to 8 bytes, and the Tspec field corresponds to 10 bytes), so as to obtain the second message.

After the DTGW of the sending side obtains the second message, the second message may be sent to a DTGW of the receiving side.

From the description of the above embodiments, it will be apparent to those having ordinary skill in the art that the methods according to the embodiments described above may be implemented by means of software plus a necessary general-purpose hardware platform, and of course may also be implemented by means of hardware, but in many cases the former is a better implementation modes. Based on such understanding, the technical solution provided by the present disclosure may be embodied in a form of a software product in essence or a part contributing to the prior art, and the computer software product is stored in a storage medium (for example, a read-only memory (ROM)/random access memory (RAM), a magnetic disk, and an optical disk), and includes several instructions for making a terminal device (may be a mobile phone, a computer, a server or a network device) execute the method of each embodiment of the present disclosure.

Embodiment 2

The embodiment provides a message sending method applied at a sending side. FIG. 9 is a flowchart of a message sending method provided in the embodiment of the present disclosure. As shown in FIG. 9, the message sending method in the embodiment includes the following operation.

At S202, a second message is sent to a receiving side.

The second message in this embodiment is obtained according to the message encapsulation method in Embodiment 1, such that the related technical features and technical effects of the second message in this embodiment correspond to those in Embodiment 1, which is not repeated herein.

From the description of the above embodiments, it will be apparent to those having ordinary skill in the art that the methods according to the embodiments described above may be implemented by means of software plus a necessary general-purpose hardware platform, and of course may also be implemented by means of hardware, but in many cases the former is a better implementation mode. Based on such understanding, the technical solution provided by the present disclosure may be embodied in a form of a software product in essence or a part contributing to the prior art, and the computer software product is stored in a storage medium (for example, a ROM/RAM, a magnetic disk, and an optical disk), and includes several instructions for making a terminal device (may be a mobile phone, a computer, a server or a network device) execute the method of each embodiment of the present disclosure.

Embodiment 3

The embodiment further provides a message processing method applied at an intermediate node. FIG. 10 is a flowchart of a message processing method provided in the embodiment of the present disclosure. As shown in FIG. 10, the message processing method in the embodiment includes the following operation.

At S302, a second message is determined and processed according to stream attribute information.

The second message in this embodiment is obtained according to the message encapsulation method in Embodiment 1, such that the related technical features and technical effects of the second message in this embodiment correspond to those in Embodiment 1, which will not be repeated herein.

It is to be further noted that the operation of determining and processing the second message indicates tracking and determination of a deterministic traffic stream; since a mapping relation between the stream attribute information and the second message is fixed, those having ordinary skill in the field may know, according to a deterministic traffic stream processing mode based on mapping objects of IP addresses, etc. in the related art, how to determine the second message according to the stream attribute information, which will not be repeated herein.

From the description of the above embodiments, it will be apparent to those having ordinary skill in the art that the methods according to the embodiments described above may be implemented by means of software plus a necessary general-purpose hardware platform, and of course may also be implemented by means of hardware, but in many cases the former is a better implementation modes. Based on such understanding, the technical solution provided by the present disclosure may be embodied in a form of a software product in essence or a part contributing to the prior art, and the computer software product is stored in a storage medium (for example, a ROM/RAM, a magnetic disk, and an optical disk), and includes several instructions for making a terminal device (may be a mobile phone, a computer, a server or a network device) execute the method of each embodiment of the present disclosure.

Embodiment 4

The embodiment further provides a message decapsulation method applied at a receiving side. FIG. 11 is a flowchart of a message decapsulation method provided in the embodiment of the present disclosure. As shown in FIG. 11, the message decapsulation method in the embodiment includes the following operation.

At S402, a second message is decapsulated, where the second message is obtained by encapsulating a first message by a sending side according to a preset encapsulation format, the first message is obtained by encapsulating a traffic stream by the sending side, the second message carries stream attribute information, and the stream attribute information is used for indicating a feature attribute of the traffic stream.

It is to be further noted that S402 is performed by the receiving side, specifically by a DTGW of the receiving side.

It is to be further noted that in S402, the decapsulation process performed on the second message corresponds to the encapsulation process of the second message; and the related technical features and technical effects of encapsulating the second message correspond to those in Embodiment 1, which is not repeated herein.

In an exemplary embodiment, the second message is obtained by encapsulating the first message by the sending side according to the preset encapsulation format, particularly, the second message is obtained by inserting at least a Tspec field at a preset position of the first message by the sending side according to the preset encapsulation format, where the Tspec field includes the stream attribute information.

In an exemplary embodiment, the stream attribute information includes at least one of:

a maximum frame length, a cycle interval, a maximum number of message per cycle, a maximum tolerable accumulated latency, a scheduling delay per node, and a maximum tolerable accumulated jitter.

In an exemplary embodiment, the Tspec field includes a N-P field, a length field, a content indication field, and an information field.

The content indication field is used for indicating, according to a preset bit definition, a type of the stream attribute information and whether the stream attribute information of the corresponding type appears in the information field. The information field is used for indicating content of the stream attribute information.

In an exemplary embodiment, the second message is obtained by encapsulating the first message by the sending side according to the preset encapsulation format, further particularly, the second message is obtained by inserting the Tspec field and a UDP header field at the preset position of the first message by the sending side according to the preset encapsulation format, where the UDP header field is inserted in front of the Tspec field.

In an exemplary embodiment, the second message is obtained by encapsulating the first message by the sending side according to the preset encapsulation format, further particularly, the second message is obtained by encapsulating the first message by the sending side according to a configured encapsulation rule, where the configured encapsulation rule includes: the configured encapsulation format and a configured deterministic traffic stream matching rule.

Herein, the deterministic traffic stream matching rule is used for matching the traffic stream with a deterministic traffic stream.

In an exemplary embodiment, the encapsulation format includes one of a first encapsulation format, a second encapsulation format, a third encapsulation format, or a fourth encapsulation format.

The first encapsulation format includes an original IP header field, a UDP header field, the Tspec field and an original IP content field.

The second encapsulation format includes a new IP header field, a UDP header field, the Tspec field, an original IP header field and an original IP content field.

The third encapsulation format includes an original IP header field, a new UDP header field, the Tspec field, an original UDP header field, an ESI header field and an original IP message content field.

The fourth encapsulation format includes a new IP header field, a new UDP header field, the Tspec field, an original UDP header field, an ESP header field, an original IP header field and an original IP content field.

In an exemplary embodiment, the second message is obtained by encapsulating the first message by the sending side according to the configured encapsulation rule, further particularly, one of the following manners is adopted.

The second message is obtained by inserting, in a case where the encapsulation format is configured to be the first encapsulation format and no original UDP header field is included in the first message, the UDP header field and the Tspec field between the original IP header field and the original IP content field of the first message by the sending side according to the first encapsulation format, and adjusting a protocol field in the original IP header field.

Alternatively, the second message is obtained by inserting, in a case where the encapsulation format is configured to be the second encapsulation format and no original UDP header field is included in the first message, the new IP header field, the UDP header field and the Tspec field in front of the original IP header field of the first message by the sending side according to the second encapsulation format.

Alternatively, the second message is obtained by inserting, in a case where the original UDP header field is included in the first message and the original UDP header field is inserted between the original IP header field and the original IP content field of the first message, the new UDP header field and the Tspec field between the original IP header field and the original UDP header field of the first message by the sending side according to the third encapsulation format.

Alternatively, the second message is obtained by inserting, in a case where the original UDP header field is included in the first message and the original UDP header field is inserted before the original IP header field of the first message, the new UDP header field and the Tspec field between the new IP header field and the original UDP header field of the first message by the sending side according to the fourth encapsulation format.

In an exemplary embodiment, the operation of decapsulating a second message includes one of the following operations.

The UDP header field and the Tspec field are removed from the second message in a case where the encapsulation format of the second message is the first encapsulation format, and a protocol field in the original IP header field is adjusted.

Alternatively, the new IP header field, the UDP header field and the Tspec field are removed from the second message in a case where the encapsulation format of the second message is the second encapsulation format.

Alternatively, the new UDP header field and the Tspec field are removed from the second message in a case where the encapsulation format of the second message is the third encapsulation format, and a protocol field in the original IP header field is adjusted.

Alternatively, the new IP header field, the new UDP header field and the Tspec field are removed from the second message in a case where the encapsulation format of the second message is the fourth encapsulation format, and a protocol field in the original IP header field is adjusted.

It is to be further noted that the decapsulation operation in S402 corresponds to the encapsulation operation of the second message, specifically, a field inserted in the first message is removed and the content of the corresponding field is adjusted during encapsulation of the second message.

In order to further illustrate the message decapsulation method in this embodiment, the following detailed description is given by way of an exemplary embodiment.

Exemplary Embodiment 4

A DTGW of the receiving side is started, in such a case, the DTGW receives a traffic stream, and the traffic stream is a second message obtained by encapsulation in a transmission mode, that is the first encapsulation format. In a determination process of the DTGW, the second message may be determined to be encapsulated by a UDT according to a UDP header field and a destination port number in the second message, and the second message is further determined not to be encapsulated in the tunnel mode according to the UDP header field and the destination port number, such that it is determined that the second message is encapsulated in the transmission mode, that is, the first encapsulation format.

In view of this, corresponding protocol information in an N-P field in a Tspec field in the second message may be assigned to an original IP header field. Moreover, the DTGW detects a length field in the Tspec field to determine that the Tspec field is 10, then a total length field and a checksum field in the original IP header field may be modified by subtracting 18 (8 bytes corresponding to the UDP header field and 10 bytes corresponding to the Tspec field) from a message length indicated by the total length field in the original IP header field.

After the DTGW removes the UDP header field and the Tspec field from the second message, the message may be forwarded again.

From the description of the above embodiments, it will be apparent to those having ordinary skill in the art that the methods according to the embodiments described above may be implemented by means of software plus a necessary general-purpose hardware platform, and of course may also be implemented by means of hardware, but in many cases the former is a better implementation modes. Based on such understanding, the technical solution provided by the present disclosure may be embodied in a form of a software product in essence or a part contributing to the prior art, and the computer software product is stored in a storage medium (for example, a ROM/RAM, a magnetic disk, and an optical disk), and includes several instructions for making a terminal device (may be a mobile phone, a computer, a server or a network device) execute the method of each embodiment of the present disclosure.

Embodiment 5

The embodiment provides a message reception method, applied at a receiving side. FIG. 12 is a flowchart of a message reception method provided in the embodiment of the present disclosure. As shown in FIG. 12, the message reception method in the embodiment includes the following operation.

At S502, a second message sent from a sending side is received, and the second message is decapsulated.

In this embodiment, the message decapsulation method in Embodiment 4 is used for decapsulating the second message, such that the related technical features and technical effects for decapsulating the second message in this embodiment correspond to those in Embodiment 4, which is not repeated herein.

From the description of the above embodiments, it will be apparent to those having ordinary skill in the art that the methods according to the embodiments described above may be implemented by means of software plus a necessary general-purpose hardware platform, and of course may also be implemented by means of hardware, but in many cases the former is a better implementation modes. Based on such understanding, the technical solution provided by the present disclosure may be embodied in a form of a software product in essence or a part contributing to the prior art, and the computer software product is stored in a storage medium (for example, a ROM/RAM, a magnetic disk, and an optical disk), and includes several instructions for making a terminal device (may be a mobile phone, a computer, a server or a network device) execute the method of each embodiment of the present disclosure.

Embodiment 6

The embodiment further provides a message encapsulation apparatus, applied at a sending side. The apparatus is used for achieving the embodiment and the exemplary implementations, and the content has been made will not be repeated. The term "module", as used below, may achieve a combination of software and/or hardware with predetermined functions. While the apparatus described in the following embodiments is preferably implemented in software, achievement of hardware, or a combination of software and hardware, are also possible and conceived.

Figure 13:
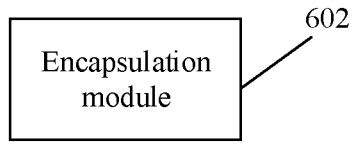
FIG. 13 is a structure diagram of a message encapsulation apparatus provided in an embodiment of the present disclosure.

FIG. 13 is a structure diagram of a message encapsulation apparatus provided in the embodiment of the present disclosure. As shown in FIG. 13, the message encapsulation apparatus in the embodiment includes:

an encapsulation module 602 configured to encapsulating a first message according to a preset encapsulation format to obtain a second message, where the first message is obtained by encapsulating a traffic stream, the second message carries stream attribute information, and the stream attribute information is used for indicating a feature attribute of the traffic stream.

In an exemplary embodiment, the operation of encapsulating the first message according to the preset encapsulation format to obtain the second message includes:

at least a Tspec field is inserted at a preset position of the first message according to the preset encapsulation format to obtain the second message, where the Tspec field includes the stream attribute information.

In an exemplary embodiment, the stream attribute information includes at least one of:

a maximum frame length, a cycle interval, a maximum number of message per cycle, a maximum tolerable accumulated latency, a scheduling delay per node, and a maximum tolerable accumulated jitter.

In an exemplary embodiment, the Tspec field includes a N-P field, a length field, a content indication field, and an information field.

The content indication field is used for indicating, according to a preset bit definition, a type of the stream attribute information and whether the stream attribute information of the corresponding type appears in the information field. The information field is used for indicating content of the stream attribute information.

In an exemplary embodiment, the operation of encapsulating the first message according to the preset encapsulation format to obtain the second message further includes:

the Tspec field and a UDP header field are inserted at the preset position of the first message according to the preset encapsulation format to obtain the second message, where the UDP header field is inserted in front of the Tspec field.

In an exemplary embodiment, the operation of encapsulating the first message according to the preset encapsulation format to obtain the second message includes:

an encapsulation rule is configured, and the first message is encapsulated according to the encapsulation rule to obtain the second message, where the operation of configuring an encapsulation rule includes: the encapsulation format is configured and a deterministic traffic stream matching rule is configured.

The deterministic traffic stream matching rule is used for matching the traffic stream with a deterministic traffic stream.

In an exemplary embodiment, the encapsulation format includes one of a first encapsulation format, a second encapsulation format, a third encapsulation format, or a fourth encapsulation format.

The first encapsulation format includes an original IP header field, a UDP header field, the Tspec field and an original IP content field.

The second encapsulation format includes a new IP header field, a UDP header field, the Tspec field, an original IP header field and an original IP content field.

The third encapsulation format includes an original IP header field, a new UDP header field, the Tspec field, an original UDP header field, an ESI header field and an original IP message content field.

The fourth encapsulation format includes a new IP header field, a new UDP header field, the Tspec field, an original UDP header field, an ESP header field, an original IP header field and an original IP content field.

In an exemplary embodiment, the operation of encapsulating the first message according to the encapsulation rule to obtain the second message includes one of the following operations.

In a case where the encapsulation format is configured to be the first encapsulation format and no original UDP header field is included in the first message, the UDP header field and the Tspec field are inserted between the original IP header field and the original IP content field of the first message according to the first encapsulation format, and a protocol field in the original IP header field is adjusted to obtain the second message.

Alternatively, in a case where the encapsulation format is configured to be the second encapsulation format and no original UDP header field is included in the first message, the new IP header field, the UDP header field and the Tspec field are inserted in front of the original IP header field of the first message according to the second encapsulation format to obtain the second message.

Alternatively, in a case where the original UDP header field is included in the first message and the original UDP header field is inserted between the original IP header field and the original IP content field of the first message, the new UDP header field and the Tspec field are inserted between the original IP header field and the original UDP header field of the first message according to the third encapsulation format to obtain the second message.

Alternatively, in a case where the original UDP header field is included in the first message and the original UDP header field is inserted in front of the original IP header field of the first message, the new UDP header field and the Tspec field inserting, between the new IP header field and the original UDP header field of the first message according to the fourth encapsulation format to obtain the second message.

In an exemplary embodiment, before the operation of encapsulating the first message according to the preset encapsulation format to obtain the second message, the method further includes:

whether a NAT function is configured between the sending side and a receiving side is detected.

Other features and advantages of the message encapsulation apparatus in this embodiment correspond to those of the message encapsulation method in Embodiment 1, which is not repeated herein.

It is to be noted that the various modules mentioned above may be implemented in software or hardware, achievement in hardware may be implemented as follows but are not limited thereto: the modules mentioned above are located in the same processor; or the modules mentioned above are separately located in different processors in any combination form.

Embodiment 7

The embodiment further provides a message sending apparatus, applied at a sending side. The apparatus is used for implementing the embodiment and the exemplary implementations, and the content has been made will not be repeated. The term "module", as used below, may achieve a combination of software and/or hardware with predetermined functions. While the apparatus described in the following embodiments is preferably implemented in software, achievement of hardware, or a combination of software and hardware, are also possible and conceived.

Figure 14:
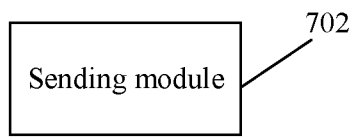
FIG. 14 is a structure diagram of a message sending apparatus provided in an embodiment of the present disclosure.

FIG. 14 is a structure diagram of a message sending apparatus provided in the embodiment of the present disclosure. As shown in FIG. 14, the apparatus in the embodiment includes:

a sending module 702 configured to send a second message to a receiving side.

Other features and advantages of the message sending apparatus in this embodiment correspond to those of the message sending method in Embodiment 2, which is not repeated herein.

It is to be noted that the various modules mentioned above may be implemented in software or hardware, achievement in hardware may be implemented as follows but are not limited thereto: the modules mentioned above are located in the same processor; or the modules mentioned above are separately located in different processors in any combination form.

Embodiment 8

The embodiment further provides a message processing apparatus, applied at an intermediate node. The apparatus is used for achieving the embodiment and the exemplary implementations, and the content has been made will not be repeated. The term "module", as used below, may achieve a combination of software and/or hardware with predetermined functions. While the apparatus described in the following embodiments is preferably implemented in software, achievement of hardware, or a combination of software and hardware, are also possible and conceived.

Figure 15:
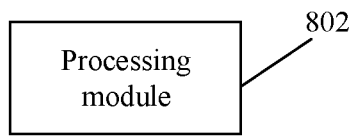
FIG. 15 is a structure diagram of a message processing apparatus provided in an embodiment of the present disclosure.

FIG. 15 is a structure diagram of a message processing apparatus provided in the embodiment of the present disclosure. As shown in FIG. 15, the apparatus in the embodiment includes:

a processing module 802 configured to determine and process a second message according to stream attribute information.

Other features and advantages of the message processing apparatus in this embodiment correspond to those of the message processing method in Embodiment 3, which will not be repeated herein.

It is to be noted that the various modules mentioned above may be implemented in software or hardware, achievement in hardware may be implemented as follows but are not limited thereto: the modules mentioned above are located in the same processor; or the modules mentioned above are separately located in different processors in any combination form.

Embodiment 9

The embodiment further provides a message decapsulation apparatus, applied at a receiving side. The apparatus is used for achieving the embodiment and the exemplary implementations, and the content has been made will not be repeated. The term "module", as used below, may achieve a combination of software and/or hardware with predetermined functions. While the apparatus described in the following embodiments is preferably implemented in software, achievement of hardware, or a combination of software and hardware, are also possible and conceived.

Figure 16:
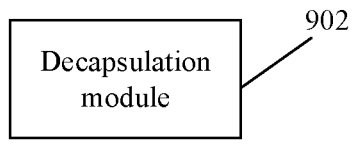
FIG. 16 is a structure diagram of a message decapsulation apparatus provided in an embodiment of the present disclosure.

FIG. 16 is a structure diagram of a message decapsulation apparatus provided in the embodiment of the present disclosure. As shown in FIG. 16, the apparatus in the embodiment includes:

a decapsulation module 902 configured to decapsulate a second message, where the second message is obtained by encapsulating a first message by a sending side according to a preset encapsulation format, the first message is obtained by encapsulating a traffic stream by the sending side, the second message carries stream attribute information, and the stream attribute information is used for indicating a feature attribute of the traffic stream.

In an exemplary embodiment, the second message is obtained by encapsulating the first message by the sending side according to the preset encapsulation format, particularly, the second message is obtained by inserting at least a Tspec field at a preset position of the first message by the sending side according to the preset encapsulation format, where the Tspec field includes the stream attribute information.

In an exemplary embodiment, the stream attribute information includes at least one of:

a maximum frame length, a cycle interval, a maximum number of message per cycle, a maximum tolerable accumulated latency, a scheduling delay per node, and a maximum tolerable accumulated jitter.

In an exemplary embodiment, the Tspec field includes a N-P field, a length field, a content indication field, and an information field.

The content indication field is used for indicating, according to a preset bit definition, a type of the stream attribute information and whether the stream attribute information of the corresponding type appears in the information field. The information field is used for indicating content of the stream attribute information.

In an exemplary embodiment, the second message is obtained by encapsulating the first message by the sending side according to the preset encapsulation format, further particularly, the second message is obtained by inserting the Tspec field and a UDP header field at the preset position of the first message by the sending side according to the preset encapsulation format, where the UDP header field is inserted in front of the Tspec field.

In an exemplary embodiment, the second message is obtained by encapsulating the first message by the sending side according to the preset encapsulation format, further particularly, the second message is obtained by encapsulating the first message by the sending side according to a configured encapsulation rule, where the configured encapsulation rule includes: the configured encapsulation format and a configured deterministic traffic stream matching rule.

The deterministic traffic stream matching rule is used for matching the traffic stream with a deterministic traffic stream.

In an exemplary embodiment, the encapsulation format includes one of a first encapsulation format, a second encapsulation format, a third encapsulation format, or a fourth encapsulation format.

The first encapsulation format includes an original IP header field, a UDP header field, the Tspec field and an original IP content field.

The second encapsulation format includes a new IP header field, a UDP header field, the Tspec field, an original IP header field and an original IP content field.

The third encapsulation format includes an original IP header field, a new UDP header field, the Tspec field, an original UDP header field, an ESI header field and an original IP message content field.

The fourth encapsulation format includes a new IP header field, a new UDP header field, the Tspec field, an original UDP header field, an ESP header field, an original IP header field and an original IP content field.

In an exemplary embodiment, the second message is obtained by encapsulating a first message by a sending side according to a configured encapsulation rule, further particularly, one of the following manners is adopted.

The second message is obtained by inserting, in a case where the encapsulation format is configured to be the first encapsulation format and no original UDP header field is included in the first message, the UDP header field and the Tspec field between the original IP header field and the original IP content field of the first message by the sending side according to the first encapsulation format, and adjusting a protocol field in the original IP header field.

Alternatively, the second message is obtained by inserting, in a case where the encapsulation format is configured to be the second encapsulation format and no original UDP header field is included in the first message, the new IP header field, the UDP header field and the Tspec field in front of the original IP header field of the first message by the sending side according to the second encapsulation format.

Alternatively, the second message is obtained by inserting, in a case where the original UDP header field is included in the first message and the original UDP header field is inserted between the original IP header field and the original IP content field of the first message, the new UDP header field and the Tspec field between the original IP header field and the original UDP header field of the first message by the sending side according to the third encapsulation format.

Alternatively, the second message is obtained by inserting, in a case where the original UDP header field is included in the first message and the original UDP header field is inserted before the original IP header field of the first message, the new UDP header field and the Tspec field between the new IP header field and the original UDP header field of the first message by the sending side according to the fourth encapsulation format.

In an exemplary embodiment, the operation of decapsulating a second message includes:

the UDP header field and the Tspec field are removed from the second message in a case where the encapsulation format of the second message is the first encapsulation format, and a protocol field in the original IP header field is adjusted; or, the new IP header field, the UDP header field and the Tspec field are removed from the second message in a case where the encapsulation format of the second message is the second encapsulation format; or, the new UDP header field and the Tspec field are removed from the second message in a case where the encapsulation format of the second message is the third encapsulation format, and a protocol field in the original IP header field is adjusted; or, the new IP header field, the new UDP header field and the Tspec field are removed from the second message in a case where the encapsulation format of the second message is the fourth encapsulation format, and a protocol field in the original IP header field is adjusted.

Other features and advantages of the message decapsulation apparatus in this embodiment correspond to those of the message decapsulation method in Embodiment 4, which will not be repeated herein.

It is to be noted that the various modules mentioned above may be implemented in software or hardware, achievement in hardware may be implemented as follows but are not limited thereto: the modules mentioned above are located in the same processor; or the modules mentioned above are separately located in different processors in any combination form.

Embodiment 10

The embodiment further provides a message reception apparatus, applied at a receiving side. The apparatus is used for achieving the embodiment and the exemplary implementations, and the content has been made will not be repeated. The term "module", as used below, may achieve a combination of software and/or hardware with predetermined functions. While the apparatus described in the following embodiments is preferably implemented in software, achievement of hardware, or a combination of software and hardware, are also possible and conceived.

Figure 17:
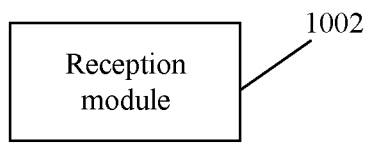
FIG. 17 is a structure diagram of a message reception apparatus provided in an embodiment of the present disclosure.

FIG. 17 is a structure diagram of a message reception apparatus provided in the embodiment of the present disclosure. As shown in FIG. 17, the apparatus in the embodiment includes:

a reception module 1002 configured to receive a second message sent from a sending side.

Other features and advantages of the message reception apparatus in this embodiment correspond to those of the message reception method in Embodiment 5, which is not repeated herein.

It is to be noted that the various modules mentioned above may be implemented in software or hardware, achievement in hardware may be implemented as follows but are not limited thereto: the modules mentioned above are located in the same processor; or the modules mentioned above are separately located in different processors in any combination form.

Embodiment 11

The embodiment of the present disclosure further provides a computer-readable storage medium. The computer-readable storage medium stores a computer program, where the computer program is configured to execute the operations of any one of the above method embodiments at runtime.

In some exemplary implementations of the embodiment, the computer-readable storage medium may be configured to store a computer program for executing the method operations in Embodiments 1-5.

In some exemplary implementations of the embodiment, the above computer-readable storage medium may include, but is not limited to, a universal serial bus flash disk, a read-only memory (ROM), a random access memory (RAM), a removable hard disk, a magnetic disk, or an optical disk, and various media that may store the computer program.

Embodiment 12

The embodiment of the present disclosure further provides an electronic apparatus, including a memory and a processor, where the memory stores a computer program, and the processor is configured to run the computer program to execute the operations of any one of the above method embodiments.

In some exemplary implementations, the electronic apparatus may further include a transmission device and an input/output device, where the transmission device is connected to the above processor, and the input/output device is connected to the above processor.

In some exemplary implementations of the embodiment, the processor may be configured to execute the method operations in Embodiment 1-5 by means of the computer program.

In some exemplary implementations, specific examples in this embodiment may be referred to the examples described in the above-mentioned embodiments and optional implementations, which are not described in detail herein.

Obviously, those having ordinary skill in the art will appreciate that the modules or operations of the present disclosure mentioned above may be achieved with a general-purpose computation apparatus, and may be centralized on a single computation apparatus or distributed on a network composed of a plurality of computation apparatuses, optionally, they may be achieved with program codes executable by the computation apparatus, such that they may be stored in a storage apparatus to be executed by the computation apparatus, and under some conditions, the operations shown or described may be executed in an order different from that herein, or they may be fabricated separately as individual integrated circuit modules, or multiple modules or operations of them may be fabricated as a single integrated circuit module for achievement. Thus, the present disclosure is not limited to any particular combination of hardware and software.

The foregoing is merely the exemplary embodiments of the present disclosure and is not intended to limit the present disclosure, and various changes and modifications may be made by those having ordinary skill in the art. Any modifications, equivalent substitutions, improvements, and the like within the principles of the present disclosure are intended to be included within the scope of protection of the present disclosure.

What is claimed is:

1. A message encapsulation method, applied at a sending side, and comprising:
when it is detected that a network address translation (NAT) function is configured between the sending side and a receiving side, encapsulating a first message according to a preset encapsulation format to obtain a second message, wherein the first message is obtained by encapsulating a traffic stream, the second message carries stream attribute information, and the stream attribute information is used for indicating a feature attribute of the traffic stream;
wherein encapsulating the first message according to the preset encapsulation format to obtain the second message comprises: configuring an encapsulation rule, and encapsulating the first message according to the encapsulation rule to obtain the second message, wherein configuring the encapsulation rule comprises: configuring the encapsulation format and configuring a deterministic traffic stream matching rule, wherein the deterministic traffic stream matching rule is used for matching the traffic stream with a deterministic traffic stream;
wherein the encapsulation format comprises one of a first encapsulation format, a second encapsulation format, a third encapsulation format, or a fourth encapsulation format, the first encapsulation format comprising an original Internet protocol (IP) header field, a UDP header field, a traffic specification (Tspec) field comprising the stream attribute information, and an original IP content field, the second encapsulation format comprising a new IP header field, a UDP header field, the Tspec field, an original IP header field and an original IP content field, the third encapsulation format comprising an original IP header field, a new UDP header field, the Tspec field, an original UDP header field, an encoding symbol identifier (ESI) header field and an original IP message content field, and the fourth encapsulation format comprising a new IP header field, a new UDP header field, the Tspec field, an original UDP header field, an encapsulating security payload (ESP) header field, an original IP header field and an original IP content field;

wherein encapsulating the first message according to the encapsulation rule to obtain the second message comprises:

inserting, in a case where the encapsulation format is configured to be the first encapsulation format and no original UDP header field is comprised in the first message, the UDP header field and the Tspec field between the original IP header field and the original IP content field of the first message according to the first encapsulation format, and adjusting a protocol field in the original IP header field to obtain the second message; or, inserting, in a case where the encapsulation format is configured to be the second encapsulation format and no original UDP header field is comprised in the first message, the new IP header field, the UDP header field and the Tspec field in front of the original IP header field of the first message according to the second encapsulation format to obtain the second message; or, inserting, in a case where the original UDP header field is comprised in the first message and the original UDP header field is inserted between the original IP header field and the original IP content field of the first message, the new UDP header field and the Tspec field between the original IP header field and the original UDP header field of the first message according to the third encapsulation format to obtain the second message; or, inserting, in a case where the original UDP header field is comprised in the first message and the original UDP header field is inserted in front of the original IP header field of the first message, the new UDP header field and the Tspec field between the new IP header field and the original UDP header field of the first message according to the fourth encapsulation format to obtain the second message.

2. The method according to claim 1, wherein encapsulating the first message according to the preset encapsulation format to obtain the second message comprises:

inserting at least the Tspec field at a preset position of the first message according to the preset encapsulation format to obtain the second message.

3. The method according to claim 1, wherein the stream attribute information comprises at least one of:

a maximum frame length, a cycle interval, a maximum number of message per cycle, a maximum tolerable accumulated latency, a scheduling delay per node, and a maximum tolerable accumulated jitter.

4. The method according to claim 3, wherein the Tspec field comprises a next protocol (N-P) field, a length field, a content indication field, and an information field;

wherein the content indication field is used for indicating, according to a preset bit definition, a type of the stream attribute information and whether the stream attribute information of the corresponding type appears in the information field, and the information field is used for indicating content of the stream attribute information.

5. The method according to claim 2, wherein encapsulating the first message according to the preset encapsulation format to obtain the second message further comprises:

inserting the Tspec field and a user datagram protocol (UDP) header field at the preset position of the first message according to the preset encapsulation format to obtain the second message, wherein the UDP header field is inserted in front of the Tspec field.

6. The method according to claim 1, wherein before encapsulating the first message according to the preset encapsulation format to obtain the second message, the method further comprises:

detecting whether a network address translation (NAT) function is configured between the sending side and the receiving side.

7. A message sending method, applied at a sending side, and comprising: sending a second message to a receiving side, wherein the second message is obtained according to the message encapsulation method of claim 1.

8. A message processing method, applied at an intermediate node, and comprising: determining and processing a second message according to stream attribute information, wherein the second message is obtained according to the message encapsulation method of claim 1.

9. A non-transitory computer-readable storage medium, storing a computer program, wherein the computer program is configured to execute the method of claim 1 at runtime.

10. An electronic apparatus, comprising a memory and a processor, wherein the memory stores a computer program, and the processor is configured to run the computer program to execute the method of claim 1.

11. A message decapsulation method, applied at a receiving side, and comprising:

decapsulating a second message, wherein the second message is obtained by encapsulating a first message by a sending side according to a preset encapsulation format, when it is detected that a network address translation (NAT) function is configured between the sending side and the receiving side, the first message is obtained by encapsulating a traffic stream by the sending side, the second message carries stream attribute information, and the stream attribute information is used for indicating a feature attribute of the traffic stream;

wherein the second message is obtained by encapsulating the first message by the sending side according to the preset encapsulation format in the following manner: the second message is obtained by encapsulating the first message by the sending side according to a configured encapsulation rule, wherein the configured encapsulation rule comprises: the configured encapsulation format and a configured deterministic traffic stream matching rule, wherein the deterministic traffic stream matching rule is used for matching the traffic stream with a deterministic traffic stream;

wherein the encapsulation format comprises one of a first encapsulation format, a second encapsulation format, a third encapsulation format, or a fourth encapsulation format, the first encapsulation format comprising an original Internet protocol (IP) header field, a UDP header field, a traffic specification (Tspec) field comprising the stream attribute information, and an original IP content field, the second encapsulation format comprising a new IP header field, a UDP header field, the Tspec field, an original IP header field and an original IP content field, the third encapsulation format comprising an original IP header field, a new UDP header field, the Tspec field, an original UDP header field, an encoding symbol identifier (ESI) header field and an original IP message content field, and the fourth encapsulation format comprising a new IP header field, a new UDP header field, the Tspec field, an original UDP header field, an ESP header field, an original IP header field and an original IP content field;

wherein the second message is obtained by encapsulating the first message by the sending side according to the configured encapsulation rule further in a following manner:

the second message is obtained by inserting, in a case where the encapsulation format is configured to be the first encapsulation format and no original UDP header field is comprised in the first message, the UDP header field and the Tspec field between the original IP header field and the original IP content field of the first message by the sending side according to the first encapsulation format, and adjusting a protocol field in the original IP header field; or, the second message is obtained by inserting, in a case where the encapsulation format is configured to be the second encapsulation format and no original UDP header field is comprised in the first message, the new IP header field, the UDP header field and the Tspec field in front of the original IP header field of the first message by the sending side according to the second encapsulation format; or, the second message is obtained by inserting, in a case where the original UDP header field is comprised in the first message and the original UDP header field is inserted between the original IP header field and the original IP content field of the first message, the new UDP header field and the Tspec field between the original IP header field and the original UDP header field of the first message by the sending side according to the third encapsulation format; or, the second message is obtained by inserting, in a case where the original UDP header field is comprised in the first message and the original UDP header field is inserted in front of the original IP header field of the first message, the new UDP header field and the Tspec field between the new IP header field and the original UDP header field of the first message by the sending side according to the fourth encapsulation format.

12. The method according to claim 11, wherein the second message is obtained by encapsulating the first message by the sending side according to the preset encapsulation format in a following manner:

the second message is obtained by inserting at least the Tspec field at a preset position of the first message by the sending side according to the preset encapsulation format.

13. The method according to claim 12, wherein decapsulating the second message comprises:

removing the UDP header field and the Tspec field from the second message in a case where the encapsulation format of the second message is the first encapsulation format, and adjusting a protocol field in the original IP header field; or, removing the new IP header field, the UDP header field and the Tspec field from the second message in a case where the encapsulation format of the second message is the second encapsulation format; or, removing the new UDP header field and the Tspec field from the second message in a case where the encapsulation format of the second message is the third encapsulation format, and adjusting a protocol field in the original IP header field; or, removing the new IP header field, the new UDP header field and the Tspec field from the second message in a case where the encapsulation format of the second message is the fourth encapsulation format, and adjusting a protocol field in the original IP header field.

14. A message reception method, applied at a receiving side, and comprising:

receiving a second message sent from a sending side, and decapsulating the second message according to the message decapsulation method in claim 11.

15. An electronic apparatus, comprising a memory and a processor, wherein the memory stores a computer program, and the processor is configured to run the computer program to execute the method of claim 11.

* * * * *